United States Patent [19]
Nagano

[11] Patent Number: 5,272,936
[45] Date of Patent: Dec. 28, 1993

[54] BICYCLE HEADSET

[75] Inventor: Masashi Nagano, Izumi, Japan

[73] Assignee: Shimano Inc., Osaka, Japan

[21] Appl. No.: 901,837

[22] Filed: Jun. 22, 1992

[30] Foreign Application Priority Data

Jun. 25, 1991 [JP] Japan .................. 3-152901

[51] Int. Cl.$^5$ ............................................. B62K 21/18
[52] U.S. Cl. ....................... 74/551.1; 280/276; 280/279
[58] Field of Search ............... 74/551.1, 551.2; 403/24; 280/276, 279, 280

[56] References Cited

U.S. PATENT DOCUMENTS

| | | | |
|---|---|---|---|
| 627,187 | 6/1899 | Hall | 74/551.1 |
| 667,232 | 2/1901 | Leaycraft | 74/551.1 |
| 2,298,494 | 10/1942 | Manton | 280/276 |
| 3,208,767 | 9/1965 | Moulton | 280/276 |
| 3,241,858 | 3/1966 | Duffy | 280/276 |
| 3,936,076 | 2/1976 | Probst | 280/276 |
| 4,068,858 | 1/1978 | Harrison et al. | 74/551.1 |
| 4,260,171 | 4/1981 | Foster | 280/279 |
| 4,274,301 | 6/1981 | Katayama | 74/551.1 |
| 4,310,260 | 1/1982 | Katayama | 74/551.1 |
| 4,340,238 | 7/1982 | Cabeza | 280/279 |
| 4,341,394 | 7/1982 | Cabeza | 280/279 |
| 4,410,197 | 10/1983 | St. Hillaire | 74/551.1 X |
| 4,436,468 | 3/1984 | Ozaki et al. | 280/279 X |
| 4,445,703 | 5/1984 | Tange | 280/279 |
| 4,531,756 | 7/1985 | Mori | 280/279 X |
| 4,593,924 | 6/1986 | Cabeza | 280/279 |
| 4,653,768 | 3/1987 | Keys et al. | 74/551.1 X |
| 4,815,763 | 3/1989 | Hartmann | 280/276 |
| 4,881,750 | 11/1989 | Hartmann | 280/276 |
| 4,960,342 | 10/1990 | Chi | 403/24 |
| 5,095,770 | 3/1992 | Rader, III | 74/551.1 |
| 5,160,210 | 11/1992 | Chen | 403/24 |

FOREIGN PATENT DOCUMENTS

| | | | |
|---|---|---|---|
| 111823 | 6/1898 | Denmark . | |
| 543949 | 9/1922 | France | 74/551.2 |
| 598369 | 12/1925 | France . | |
| 2397316 | 3/1979 | France | 74/551.1 |
| 234241 | 5/1925 | United Kingdom . | |

*Primary Examiner*—Leslie A. Braun
*Assistant Examiner*—Ryan W. Massey
*Attorney, Agent, or Firm*—Dickstein, Shapiro & Morin

[57] ABSTRACT

A headset for rotatably attaching a fork stem to a head pipe of a frame of a bicycle or the like. The headset includes an inner tube fitted on an outer surface of the fork stem, an outer tube coaxially surrounding the inner tube and fitted in an inner surface of the head pipe, and a ball bearing mounted between the inner tube and outer tube for allowing relative rotation about an axis thereof and restricting relative axial movement between the inner tube and the outer tube. The inner tube, outer tube and ball bearing are assembled into an integral unit attachable to and detachable from the head pipe and fork stem.

7 Claims, 7 Drawing Sheets

BICYCLE HEADSET

BACKGROUND OF THE INVENTION

1. Field of the Invention

The present invention relates to a steering head structure for steerably connecting a front wheel to the body frame of a bicycle.

2. Description of the Related Art

Figure 7:
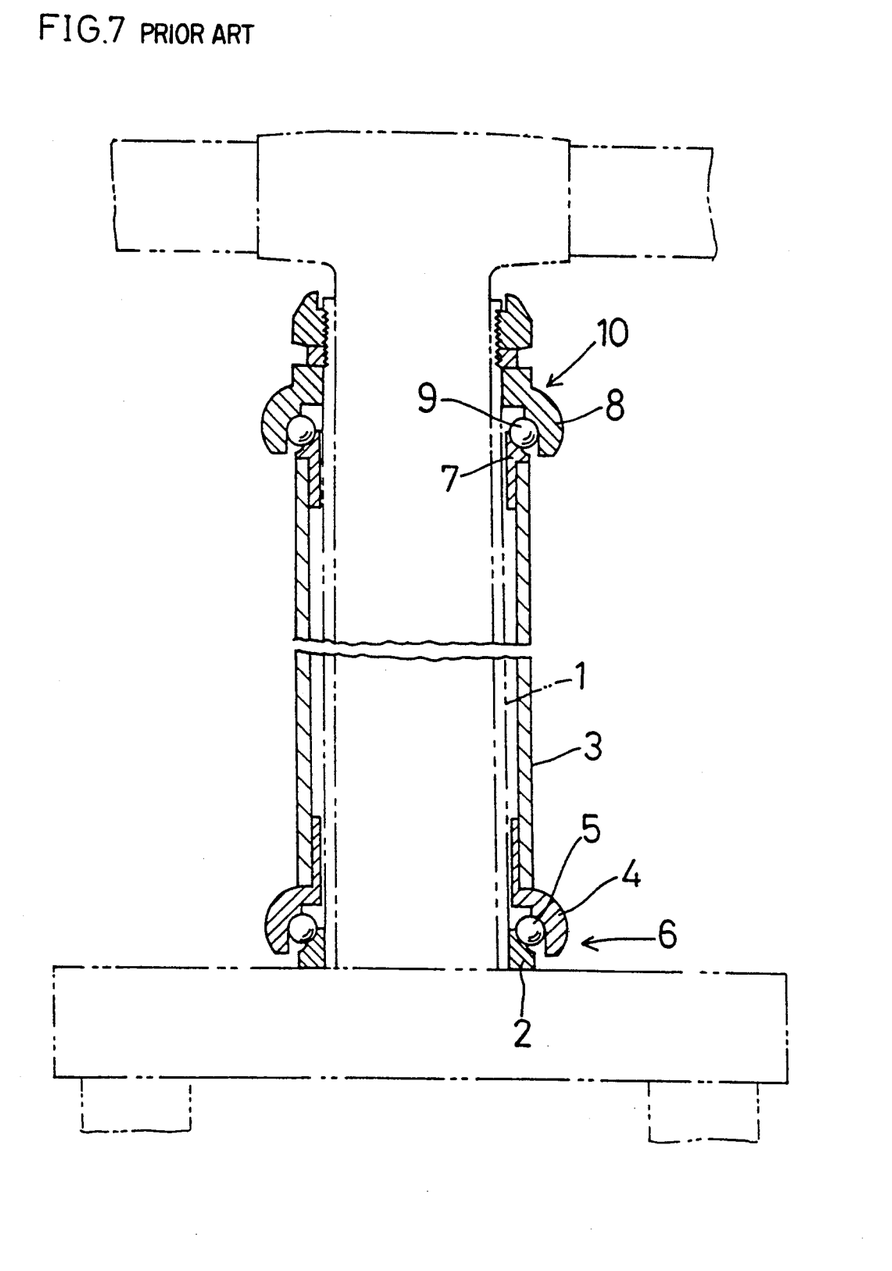
FIG. 7 is a sectional view of a conventional steering head structure.

As shown in FIG. 7, a steering head structure designed not only for a bicycle but for a motorcycle or a motor scooter has a lower bearing device 6 and an upper bearing device 10. The lower bearing device 6 includes a lower inner race 2 fitted on a fork stem 1, a lower outer race 4 fitted in a lower end of a head pipe 3, and balls 5. The upper bearing device 10 includes an upper inner race 7 fitted in an upper end of the head pipe 3, an upper outer race 8 fitted on the fork stem 1, and balls 9.

In the conventional steering head structure as noted above, a clamping nut and locknut are screwed to an upper position of the fork stem projecting above the upper outer race. A pressure of contact between the balls and races of the upper and lower bearing devices is determined by a clamping force of the clamping nut. If the clamping force is insufficient, steering control becomes unstable with chattering of the bearing devices, and collisions between balls and races may damage sliding surfaces thereof. If the clamping force is too strong, the steering control becomes heavy, and the balls could inflict indentations on the sliding surfaces of the races to impair a smooth steering control. It is therefore important to fix the clamping nut with a proper tightening torque.

In an actual assembly operation, the nut must be tightened while checking if a light steering control may be made without chattering, i.e. taking the ball contact pressure into account. Thus, the operation to assemble the steering head structure is relatively difficult and irksome.

SUMMARY OF THE INVENTION

The object of the present invention is to provide a steering head structure easy and simple to assemble in an excellent rotatable condition, and particularly to eliminate the trouble of adjusting the ball contact pressure.

The above object is fulfilled, according to the present invention, by a headset for rotatably attaching a fork stem to a head pipe of a frame of a bicycle or the like, comprising an inner tube fitted on an outer surface of the fork stem, an outer tube coaxially surrounding the inner tube and fitted in an inner surface of the head pipe, and a bearing device mounted between the inner tube and outer tube for allowing relative rotation about an axis thereof and restricting relative axial movement between the inner tube and outer tube, wherein the inner tube, outer tube and bearing device are assembled into an integral unit attachable to and detachable from the head pipe and the fork stem.

With the headset having the above construction, the outer tube, inner tube and bearing device may be preassembled as a unit in an excellent, rotatable condition free from twisting and chattering. The assembly operation may be carried out within a factory of a component manufacturer, for example. The preassembled unit including the outer tube, inner tube and bearing device may be assembled to the head pipe and fork stem in one effort, with the outer tube fitted on the fork stem, and the inner tube fitted in the head pipe. As a result, the unit is assembled in the excellent, rotatable state to the fork stem and head pipe. The fork stem and head pipe are connected in a smoothly rotatable state without twisting and chattering, to realize an ideal steering head structure.

Where the outer tube, inner tube and bearing device are provided as a unit for assembly, a steering head structure having an excellent rotational feature is obtained without requiring an adjustment of rotation at a time of assembly.

Other features and advantages of the present invention will be apparent from the following description of the preferred embodiments taken with reference to the drawings.

DETAILED DESCRIPTION OF THE PREFERRED EMBODIMENTS

Embodiments of the present invention will be described hereinafter with reference to the drawings.

Figure 1:
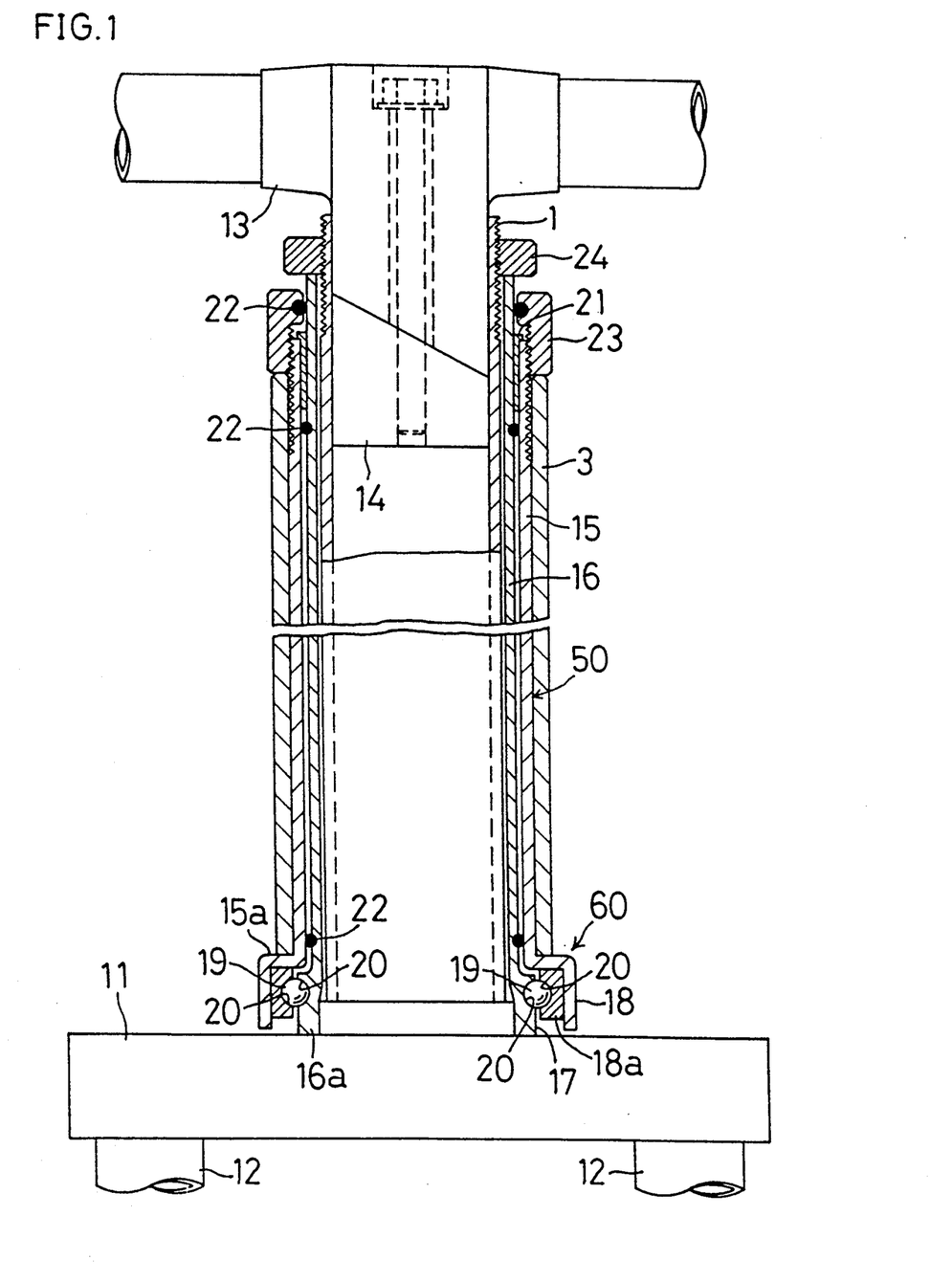
FIG. 1 is a sectional view of a steering head structure according to the present invention.

FIG. 1 shows a steering head structure for a bicycle. Numeral 1 denotes a tubular fork stem fixedly connected to and supported by a shoulder bracket 11. The shoulder bracket 11 has a pair of right and left fork braces 12 fixed thereto for supporting a front wheel not shown. Numeral 3 denotes a head pipe forming a part of a bicycle frame. Numeral 13 denotes a handle stem. Numeral 14 denotes an inclined cam mounted in the fork stem 1 for engaging the handle stem 13. The inclined cam 14 is radially displaceable by screw drive, to fix the handle stem 13 inside the tubular fork stem 1.

Numeral 15 denotes an outer tube fitted in contact with an inner peripheral wall of the head pipe 3. Numeral 16 denotes an inner tube surrounding an outer peripheral wall of the fork stem 1. The outer tube 15 and inner tube 16, together with a ball type bearing device 60, are assembled into an integral unit to constitute a headset 50, in which the two tubes 15 and 16 are rotatable and not axially movable relative to each other.

Specifically, the inner tube 16 includes an inner race section 17 formed at a lower end thereof, while the outer tube 15 includes an outer race section 18 formed at a lower end thereof and opposed to the inner race section 17. Further, an intermediate ring 18a is fitted on an inner peripheral wall of the outer race section 18. A plurality of steering balls 19 are arranged circumferentially at uniform intervals between the intermediate ring 18a and inner race section 17. These components constitute the ball type bearing device 60. The intermediate ring 18a may be omitted by assembling the inner race section 17 and outer race section 18 having suitably selected sizes and shapes and a suitably selected number of balls 19. In this embodiment, the intermediate ring 18a and inner race section 17 define ball receiving portions 20 of semicircular section, respectively, for restricting displacement of the steering balls 19 axially of the fork stem 1. The outer race section 18 and inner race section 17, and thus the outer tube 15 and inner tube 16, are assembled into an integral unit acting as the bearing device 60, with the balls 19 fitted in the ball receiving portions 20. These components of the bearing device 60 will not become inadvertently disassembled. Numeral 21 denotes a bush acting as an additional bearing device between upper ends of the outer tube 15 and inner tube 16. The bush 21 may only have a radial position setting function since the above-mentioned bearing device 60 can bear thrust loads acting in opposite directions. Thus, the bush 21 acts as a slide bearing as it allows the outer tube 15 and inner tube 16 to rotate relative to one another by sliding. Bush 21 may be formed of plastic or the like. Numeral 22 denotes rubber O-rings to act as dust- and water-proofing seals and also to suppress sideways vibrations between the fork stem 1 and head pipe 3.

The outer tube 15 has a flange 15a formed at the lower end thereof, and a first locknut 23 screwed to the upper end thereof. The outer tube 15 is attached to the head pipe 3 with the flange 15a and locknut 23 holding the head pipe 3 therebetween. The inner tube 16 has the lower end thereof abutting against the shoulder bracket 11, and is attached to the fork stem 1 by tightening a second locknut 24 screwed to an upper end of the fork stem 1.

Figure 2:
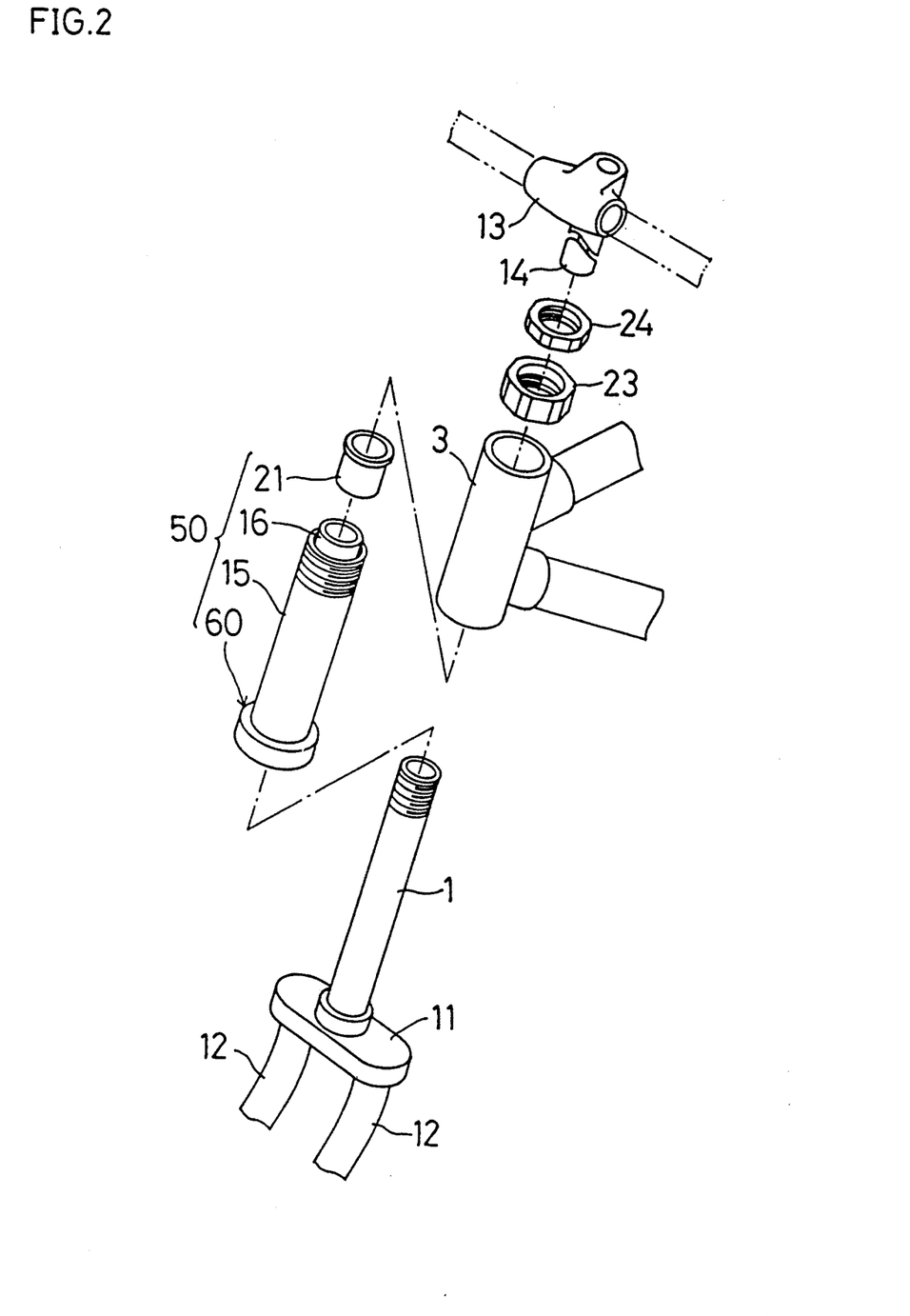
FIG. 2 is an exploded perspective view of the steering head structure.

With the first and second locknuts 23 and 24 removed, as shown in FIG. 2, the outer tube 15 may be drawn downwardly out of the head pipe 3 while the fork stem 1 may be drawn downwardly out of the inner tube 16. Thus, the fork stem 1, headset 50 and head pipe 3 may be disassembled quickly. These three components may be assembled quickly by a reverse operation. The conventional ball type steering structure in which the upper and lower bearing devices support numerous balls mounted between the races, as described in the introductory part hereof, has the drawback that the balls could fall inadvertently and be lost when the fork stem and head pipe are disassembled. At a time of assembly, it is necessary to apply grease and arrange the numerous balls circumferentially not to be easily movable on the inner races. While maintaining this state, the fork stem and head pipe are moved relative to each other to a mutually fitting position. Thus, the conventional steering structure requires an extremely irksome operation to change the forks. In the present invention, the headset has the components assembled as a unit in a desired, adjusted state. This headset may simply be assembled with the fork stem 1 and head pipe 3.

When changing the fork stem, the fork stem may just be removed from the inner tube forming part of the headset, and a new fork stem may be inserted into the inner tube. When changing the bicycle frame, it is only necessary to remove the head pipe from the outer tube and to attach a new head pipe to the outer tube. Further, by replacing the headset itself with one having a different size or diameter, changes in the diameter or other modifications may be made easily to the head pipe and fork stem.

Figure 3:
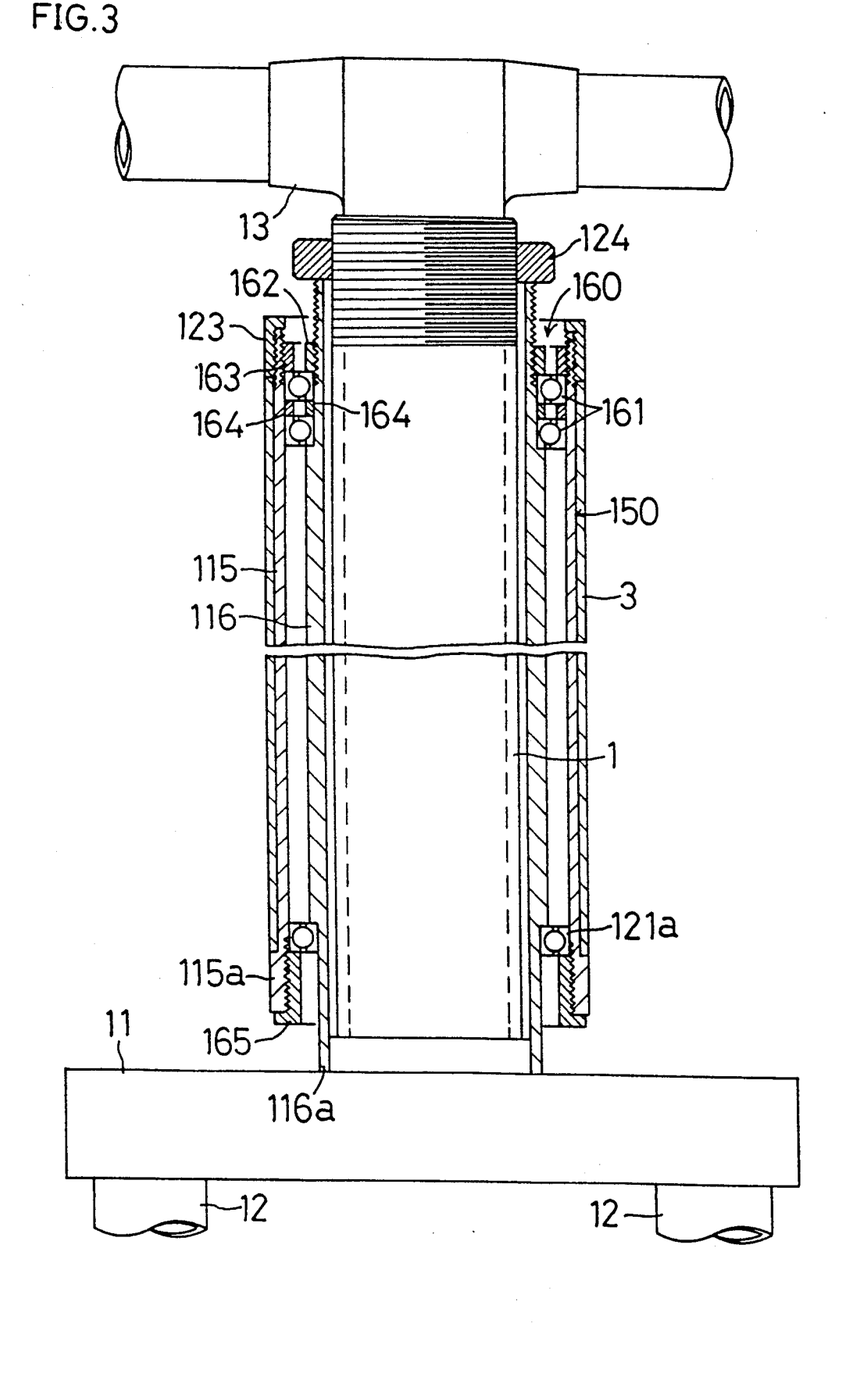
FIG. 3 is a sectional view of a steering head structure in another embodiment of the invention.

FIG. 3 shows a headset in another embodiment of the invention. This headset 150 has a bearing device 160 employing ordinary, commercially available bearing units. In the embodiment shown in FIG. 3, bearing units 161 capable of bearing also thrust loads are disposed at the upper end, while a bearing unit 121a is disposed at the lower end for bearing only radial loads. An inner tube 116 includes an upper stepped portion having a radial surface for receiving one end of one of the bearing units 161. A spacer ring 164 is mounted between the two bearing units 161. The bearing units 161 are fixed in place between the inner tube 116 and outer tube 115 by an inner bearing presser ring 162 screwed to the inner tube 116 and an outer bearing presser ring 163 screwed to the outer tube 115. The inner tube 116 further includes a lower stepped portion for receiving the bearing unit 121a. A bearing presser 165 is screwed to the outer tube 115 for fixing the bearing unit 121a in place.

In this embodiment also, the outer tube 115 has a flange 115a formed at the lower end thereof, and a first locknut 123 screwed to the upper end thereof. The outer tube 115 is attached to the head pipe 3 with the flange 115a and locknut 123 holding the head pipe 3 therebetween. The inner tube 116 has a lower end 116a thereof abutting against the shoulder bracket 11, and is attached to the fork stem 1 by tightening a second locknut 124 screwed to an upper end of the fork stem 1.

Figure 4:
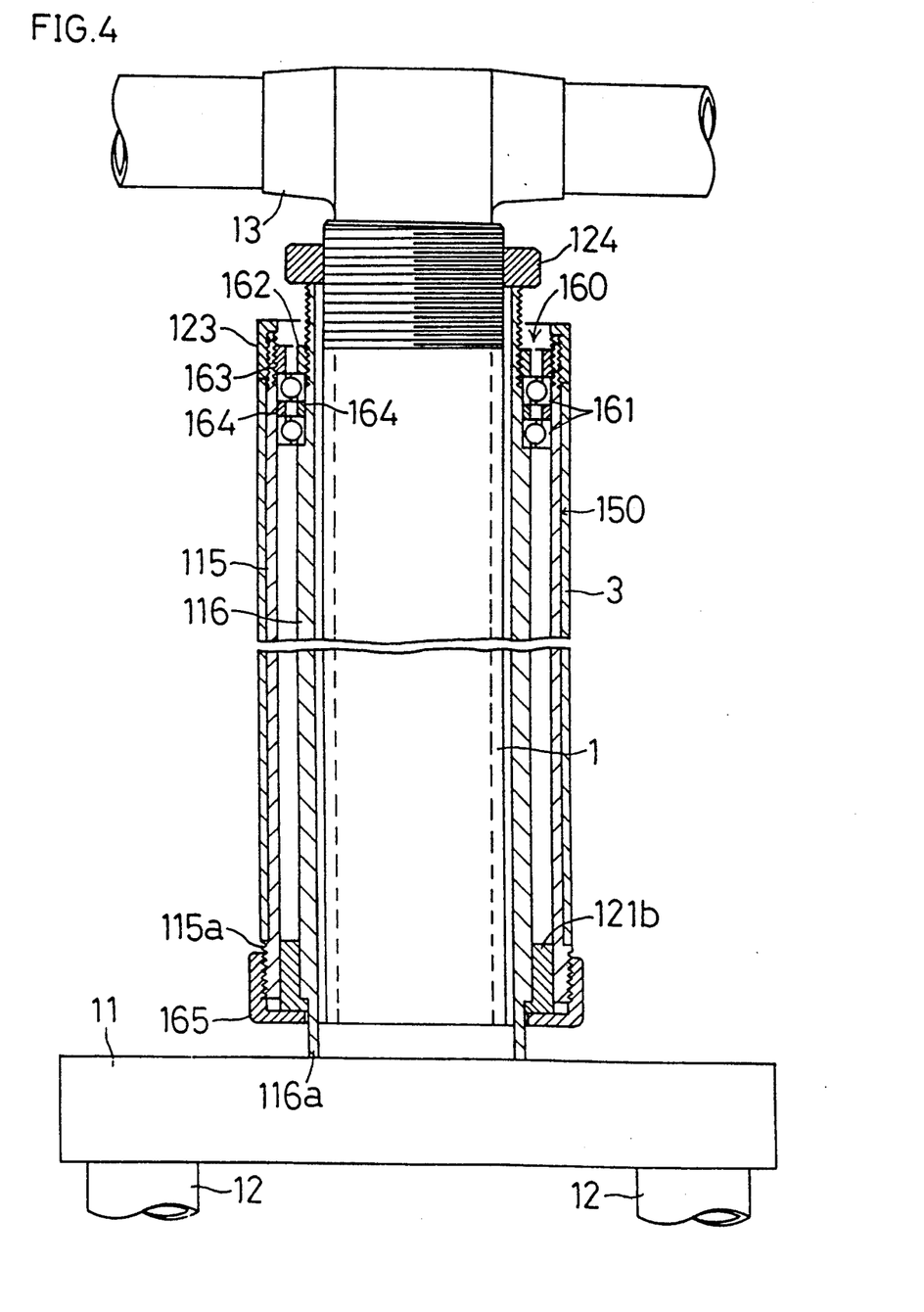
FIG. 4 is a sectional view of a modification of the steering head structure shown in FIG. 3.

FIG. 4 shows a modification of the headset 150 shown in FIG. 3. In this modification, the bearing unit 121a is replaced with a plastic bush 121b acting as a slide bearing. The other aspects are basically the same as in FIG. 3.

Figure 5:
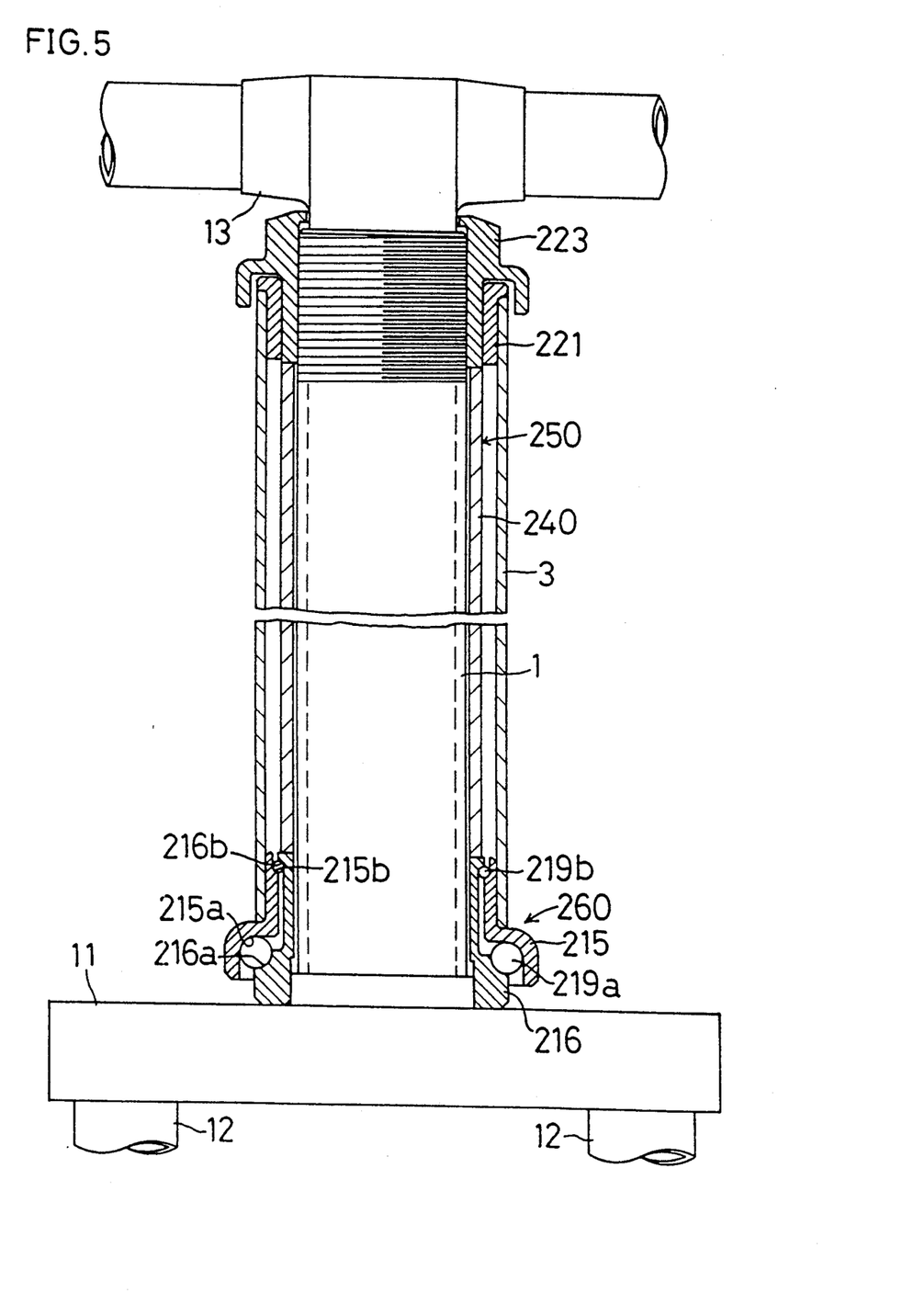
FIG. 5 is a sectional view of a steering head structure in a further embodiment of the invention.

FIG. 5 shows a headset in a further embodiment of the invention. This headset 250 has a bearing device 260 employing two types of balls, i.e. large balls 219a and small balls 219b. In this embodiment, an inner tube 216 has a reduced length to surround only a lower region of the fork stem 1. An outer tube 215 also has a reduced length corresponding to the inner tube 216.

The inner tube 216 defines, on outer peripheries thereof, a ball receiving surface 216a for receiving the large balls 219a, and a ball receiving surface 216b axially spaced from the surface 216a for receiving the small balls 219b. Similarly, the outer tube 215 defines, on inner peripheries thereof, a ball receiving surface 215a for receiving the large balls 219a, and a ball receiving surface 215b axially spaced from the surface 215a for receiving the small balls 219b. The ball receiving surfaces 215a and 216a are opposed to each other, and the ball receiving surfaces 215b and 216b are also opposed to each other. As seen from FIG. 5, the balls and the ball receiving surfaces are shaped to allow the bearing device 260 to bear both thrust load and radial load. The outer tube 215 includes a flange extending radially for defining the ball receiving surface 215a. This flange is used to attach the headset 250 to the head pipe 3.

A spacer pipe 240 is disposed to abut on an upper end surface of the inner tube 216 and surround the fork stem 1. The spacer pipe 240 is pressed downwardly by a locknut 223 screwed to the upper end of the fork stem 1, thereby to secure the inner tube 216 to the fork stem 1. A flanged bush 221 is mounted between the locknut 223 and the upper end of the fork stem 1 to act as a slide bearing. This bush determines a radial space between the fork stem 1 and head pipe 3 while allowing relative rotation therebetween. The spacer pipe 240 and inner tube 216 may be interconnected through screws.

Figure 6:
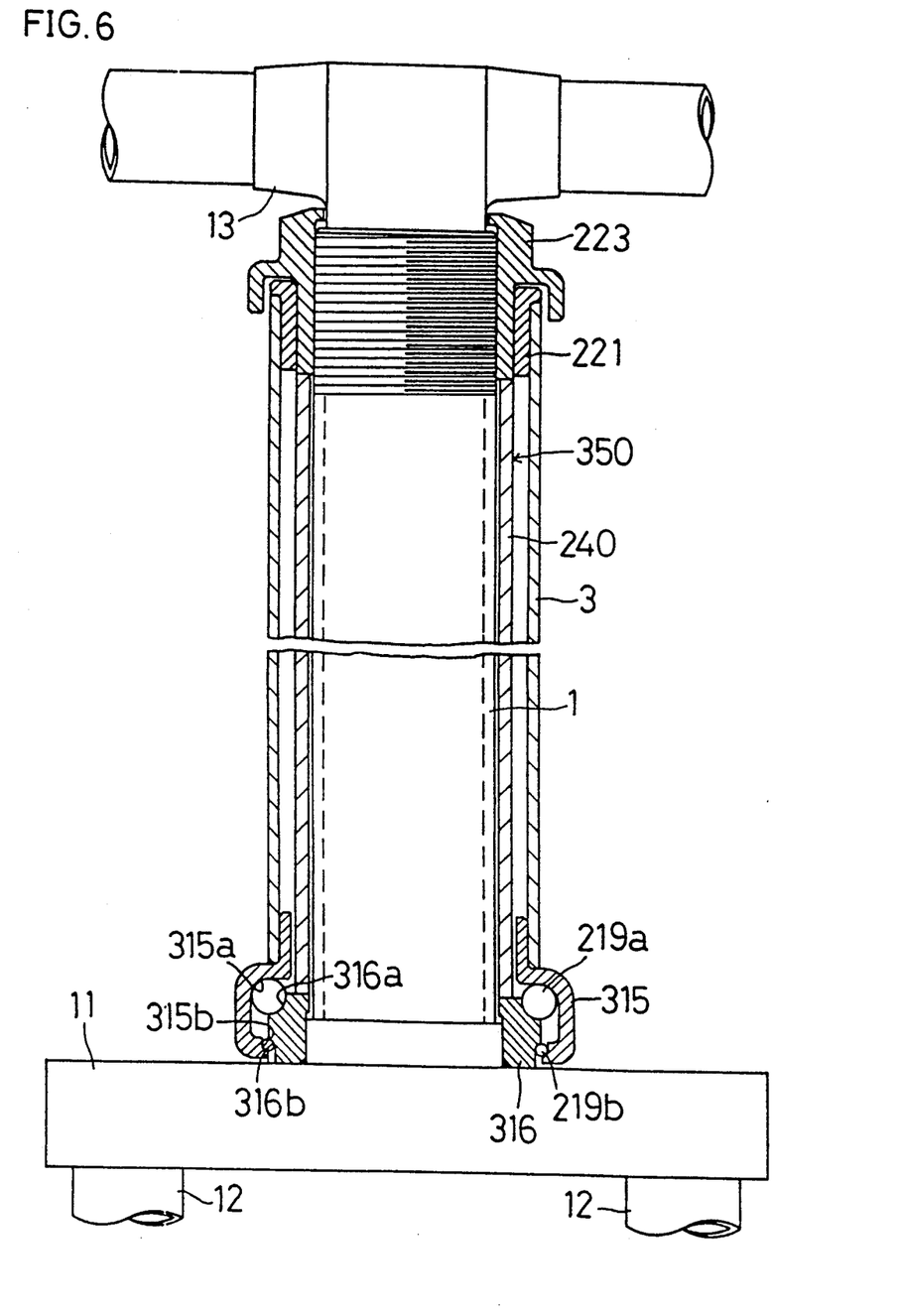
FIG. 6 is a sectional view of a modification of the steering head structure shown in FIG. 5.

FIG. 6 shows a modification of the headset 250 shown in FIG. 5. As seen, a headset 350 in this modification differs from the headset 250 in FIG. 5 in that the positions of the large balls 219a and small balls 219b are reversed. Accordingly, the positions of the ball receiving surfaces 315a and 315b formed on the outer tube 315 and the positions of the ball receiving surfaces 316a and 316b formed on the inner tube 316 are also reversed.

Having described various embodiments of the invention, it is pointed out that the embodiment shown in FIG. 1, in particular, has the advantages of simplified construction and low manufacturing cost in that the steering balls 19 are arranged circumferentially of only one position with respect to the axial direction of the headset.

Although balls are used in the bearings in all of the described embodiments and modifications, it is possible within the scope of the present invention to use only bushes instead of using the balls.

Caulking, lock pins or other devices may be used in place of the locknuts for axially immovably fixing the outer tube and inner tube to the head pipe 3 or fork stem 1.

What is claimed is:

1. A headset for rotatably attaching a fork stem to a head pipe of a frame of a vehicle having a head pipe and a fork stem, comprising:
   an inner tube adapted to be fitted on an outer surface of a fork stem;
   an outer tube coaxially surrounding said inner tube and adapted to be fitted in an inner surface of a head pipe;
   first bearing means mounted between said inner tube and said outer tube for allowing relative rotation about an axis thereof and restricting relative axial movement between said inner tube and said outer tube; and
   restricting means for restricting relative axial movement between said inner tube and outer tube and retaining said inner tube, said outer tube and said first bearing means together as an integral self-contained unit which is attachable to and detachable from said head pipe and said a fork stem as a unit, said restricting means including said first bearing means.

2. A headset as claimed in claim 1, wherein said first bearing means is formed as a ball bearing mounted between said inner tube and said outer tube and capable of bearing thrust loads and radial loads.

3. A headset as claimed in claim 2, further comprising an additional a second bearing means formed as a radial ball bearing for allowing relative rotation between said head pipe and said fork stem.

4. A headset as claimed in claim 1, wherein said restricting means includes a first ball receiving surface provided on one of said inner tube and said outer tube, and a second ball receiving surface provided on the other of said inner tube and said outer tube.

5. A headset for rotatably attaching a fork stem to a head pipe of a frame of a vehicle having a head pipe and a fork stem, comprising:
   an inner tube adapted to be fitted on an outer surface of a fork stem;
   an outer tube coaxially surrounding said inner tube and adapted to be fitted in an inner surface of a head pipe;
   first bearing means mounted between said inner tube and said outer tube for allowing relative rotation about an axis thereof and restricting relative axial movement between said inner tube and said outer tube, said first bearing means being formed as a ball bearing mounted between said inner tube and said outer tube and capable of bearing thrust loads and radial loads,
   a second bearing means formed as a radial ball bearing for allowing relative rotation between said head pipe and said fork stem, said radial ball bearing being mounted between said inner tube and said outer tube; and
   restricting means for restricting relative axial movement between said inner tube and outer tube and retaining said inner tube, said outer tube and said first bearing means together as an integral self-contained unit which is attachable to and detachable from said head pipe and said fork stem as a unit, said restricting means including said first bearing means.

6. A headset for rotatably attaching a fork stem to a head pipe of a frame of a vehicle having a head pipe and a fork stem, comprising:
   an inner tube adapted to be fitted on an outer surface of a fork stem;
   an outer tube coaxially surrounding said inner tube and adapted to be fitted in an inner surface of a head pipe;
   first bearing means mounted between said inner tube and said outer tube for allowing relative rotation about an axis thereof and restricting relative axial movement between said inner tube and said outer tube, said first bearing means being formed as a ball bearing mounted between said inner tube and said outer tube and capable of bearing thrust loads and radial loads,
   a second bearing means formed as a radial ball bearing for allowing relative rotation between said head pipe and said fork stem, said second bearing means being formed as a slice bearing for allowing relative rotation between said head pipe and said fork stem; and,
   restricting means for restricting relative axial movement between said inner tube and outer tube and retaining said inner tube, said outer tube, said first bearing means and said second bearing means together as an integral self-contained unit which is attachable to and detachable from said head pipe and said fork stem as a unit, said restricting means including said first bearing means.

7. A headset as claimed in claim 6, wherein said slide bearing is mounted between said inner tube and said outer tube.

* * * * *